United States Patent [19]
Johnson

[11] 3,762,229
[45] Oct. 2, 1973

[54] VARIABLE POWER RATIO DEVICE
[75] Inventor: Ted W. Johnson, Griffin, Ga.
[73] Assignee: Hamilton Brothers Mfg. Co., Atlanta, Ga.
[22] Filed: July 10, 1972
[21] Appl. No.: 270,085

[52] U.S. Cl. ............................................. 74/217 S
[51] Int. Cl. ............................................. F16h 9/04
[58] Field of Search ...................... 74/217 S, 217 R

[56] References Cited
UNITED STATES PATENTS
2,742,793 4/1956 Askren et al. ..................... 74/217 S
3,276,280 10/1966 Zeuthen ............................. 74/217 S

*Primary Examiner*—Leonard H. Gerin
*Attorney*—Edward Taylor Newton et al.

[57] ABSTRACT

A variable ratio drive device including a rotatably supported drive shaft having a pair of axially shiftable pulleys rotatably fixed thereto, with the pulleys being of different diameters and coaxially fixed to each other, and wherein each pulley includes a grooved rim so as to form a sheave. The common edge of the juxtaposed pulley sheave elements include a cutout or flat portion detailed to cause a belt to be shifted from one pulley to the other pulley in response to an axial shifting and rotary movement of the pair of pulleys. The variable ratio drive device includes lever means for effecting axial shifting movement of the pair of pulleys. An idler pulley is operatively associated with the pair of pulleys for maintaining tension on a drive belt operatively supported on a selected one of the pair of pulleys. The variable ratio drive device is operable to either receive driving power through the drive shaft and for delivering variable output drive to a driven shaft, or is operable for receiving drive to the pair of pulleys and for delivering variable output drive to the supporting drive shaft.

10 Claims, 4 Drawing Figures

PATENTED OCT 2 1973

VARIABLE POWER RATIO DEVICE

BACKGROUND OF THE INVENTION

This invention relates to a device for use with a drive shaft for effecting a variable output drive in response to a constant input drive and is more particularly concerned with a belt and pulley arrangement which are shiftable relative to each other for producing a variable output drive.

One such variable output drive is disclosed in the U.S. Pat. to Askren, et al., No. 2,742,793 issued Apr. 24, 1956. The Askren, et al. two speed drive arrangement includes a motor having a drive shaft with a pair of pulley elements fixed thereto. The pair of coaxial pulleys of different diameters are operatively associated with a drive shaft for delivering an output drive to a second pulley. The belt is shifted between the pair of pulleys by axially shifting the pair of pulleys relative to the supporting drive shaft and the driven belt. The belt is caused to move from one drive pulley to an adjacent juxtaposed drive pulley by a plurality of radial vanes which extend from and are fixed to the drive shaft, with the pair of pulleys being axially shiftable relative to the vanes to cause the belts to be displaced from one pulley to an adjacent pulley. One problem with the two speed drive arrangement of Askren, et al. is that the pair of pulleys and belt shifting means require a number of precision parts which would be expensive to manufacture, complex to assemble and unreliable in performance. Another problem with the two speed drive arrangement of Askren, et al. is that the drive belt does not include means for automatically adjusting the tension in the belt when moved from one diameter drive pulley to another diameter drive pulley.

A number of other attempts have been made to provide variable ratio drive devices using belt and pulley arrangements. Most of these prior art devices include different diameter pulleys which are axially fixed to a supporting shaft in which a variable drive is obtained by manually pushing the belt from one pulley to an adjacent pulley. One problem with this type of drive arrangement is that where a single output pulley is used, this type of shifting movement of the belt will not provide for accurate alignment between the belts and the pulley arrangement, thus causing undue wear in the driving mechanism.

SUMMARY OF THE INVENTION

The above stated disadvantages of the prior art have been overcome by the present invention which basically includes a pair of pulley elements which are coaxially fixed to each other, with the pulley elements being of different diameters, and wherein the common edge of the juxtaposed pulleys include a cutout or flat portion which will cause a belt to move from one pulley to the adjacent pulley when the pulleys are shifted axially relative to the driving plane of the belt.

One important feature of the present invention is to provide a variable ratio drive device in which the belt tension is automatically adjusted during shifting from one diameter pulley to a second diameter pulley.

A further object of the present invention is to provide a support and shifting means for a pair of pulleys whereby the pulleys can be axially shiftable and rotatably fixed to a supporting drive shaft.

Another object of the present invention is to provide means for absorbing impact of movement of an idler pulley as a driving belt moves from one diameter pulley to a second diameter pulley.

An additional object of the present invention is to provide a variable ratio drive device which is simple in construction, economical to manufacture and reliable in performance.

These and other objects and advantages of the details of construction will become apparent after reading the following description of the illustrative embodiment of the present invention, with reference to the attached drawings, wherein like reference numerals have been used to refer to like parts throughout the several figures, and wherein:

DESCRIPTION OF THE ILLUSTRATIVE EMBODIMENT

Figure 1:
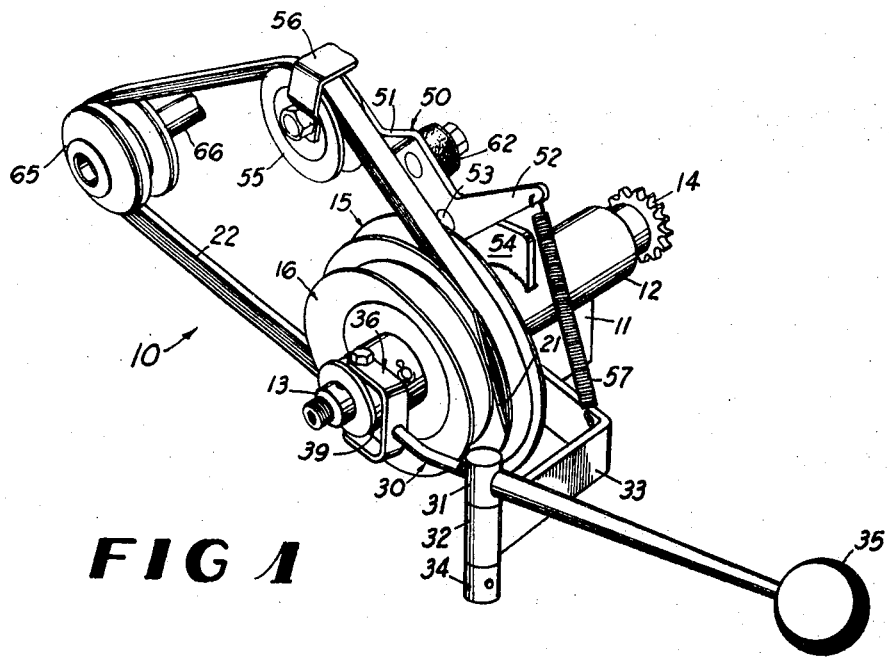
FIG. 1 is a perspective view of the variable ratio drive device embodying the principles of the present invention.
Figure 2:
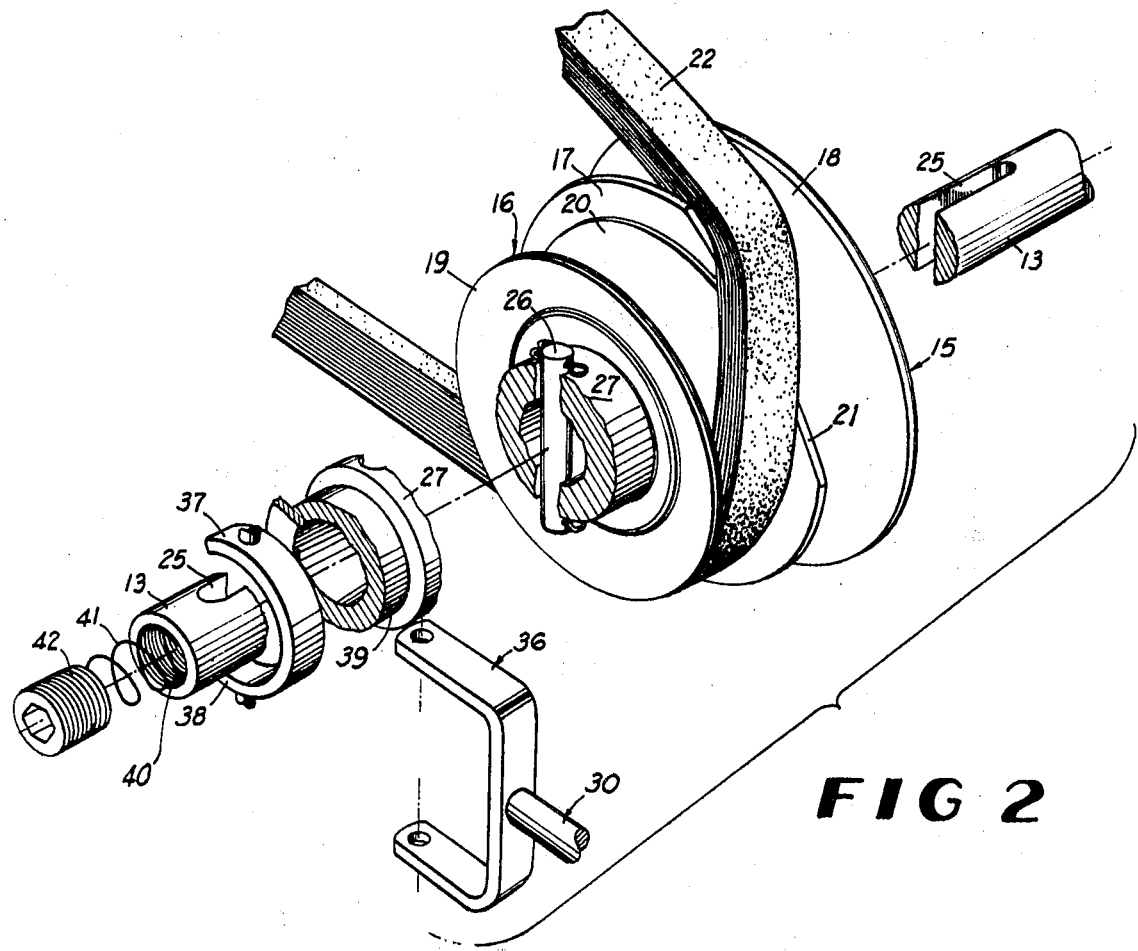
FIG. 2 is an enlarged fragmentary exploded perspective view of FIG. 1, with certain parts omitted and certain parts broken away and shown in section for purpose of clarity.

Referring now to the drawings, the variable ratio drive device embodying the principles of the present invention is shown in FIG. 1 and generally represented by the reference numeral 10. The variable ratio drive device includes a base support means 11 having a cylindrical bushing 12 attached thereto. Cylindrical bushing 12 is detailed for rotatably supporting drive shaft 13. One end of the drive shaft 13 extends rightwardly through bushing 12 and is provided with a driving sprocket 14. An opposite end of drive shaft 13 is provided with a pair of variable ratio drive pulleys 15,16. Drive pulley 15 is of larger diameter than pulley 16, with both of the pulleys being grooved and coaxially fixed to each other. The larger pulley 15 is provided with a pair of wall elements 17, 18 and the smaller pulley is provided with a pair of wall elements 19, 20. When the pulleys are fixed together, the larger diameter wall element 17 is juxtapositioned adjacent the smaller diameter wall element 20. As shown in FIG. 2, the larger diameter wall element 17 is provided with a cutout portion 21 which will cause a drive belt 22 to be shifted from one drive pulley to the other drive pulley in response to axial shifting and rotary movement of the pair of pulleys 15, 16.

As shown in FIG. 2, the pair of pulleys 15, 16 are supported for axial sliding movement relative to shaft 13 and are rotatably fixed thereto. Drive shaft 13 is provided with an elongated slot 25 through which a pulley connecting pin 26 extends. Pin 26 is secured within a pulley collar 27 by conventional retaining means. The slot 25 and pin 26 will permit axial shifting movement of the pair of pulleys 15, 16 but will fix the pulleys to the shaft for rotary movement therewith.

Figure 3:
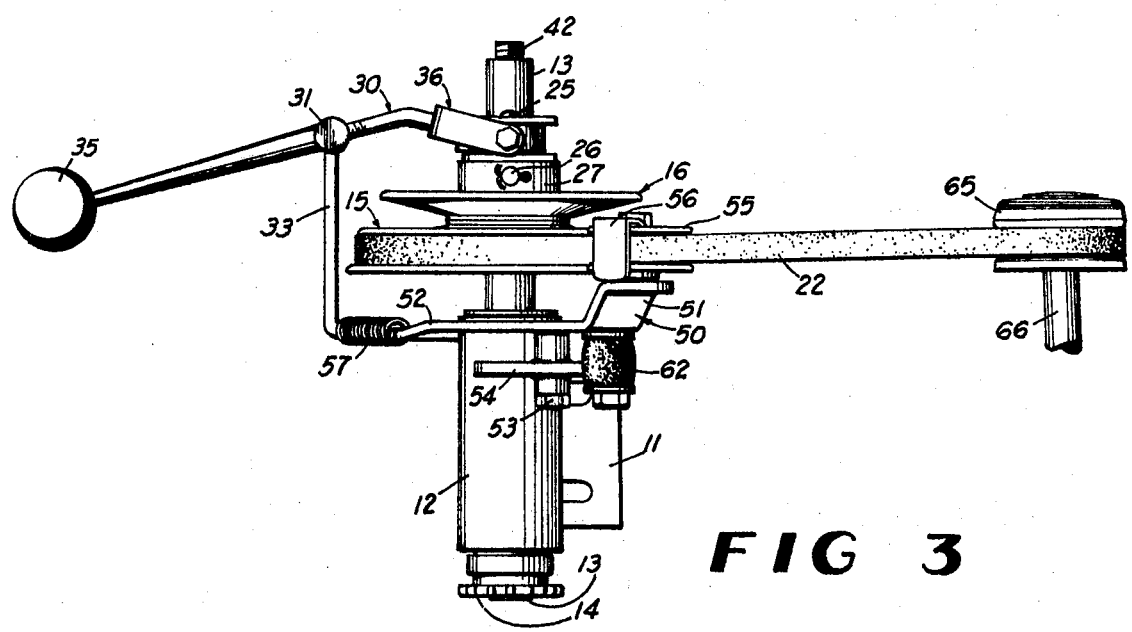
FIG. 3 is a top plan view of the device shown in FIG. 1.

As shown in FIGS. 1 and 3, the pair of pulleys 15, 16 are axially shifted relative to drive shaft 13 by means of an elongated lever 30. Lever 30 is pivoted adjacent an intermediate portion by means of a vertical pivot pin 31 which extends through a sleeve 32. Sleeve 32 is fixed to an angle support bracket 33 which has its opposite end connected to the mounting bracket 11. Pivot pin 31 is secured in a set position within sleeve 32 by means of a retaining collar and cotter pin means 34. One end of the lever 30 is provided with a handle shifting means 35, with an opposite end of the lever being provided with a yoke shifting element 36.

As shown in FIG. 2, yoke 36 includes a pair of pivotally mounted bearing elements 37, 38 which are rotatably supported within an annular groove 39 provided on the pulley collar 27. Bearing elements 37, 38 will permit rotary movement of the collar and pulleys relative to the yoke 36, but will be operable for effecting axial shifting movement of the pulleys relative to the drive shaft 13. The left end of shaft 13 is provided with an internally threaded opening 40 which is adapted to receive a coil spring means 41. Coil spring 41 is adapted to provide a cushion means for limiting the axial shifting movement of the pulley to the left, as shown in FIGS. 1 and 2. When the pulleys 15, 16 are axially shifted leftward, pin 26 will contact spring 41 to provide a cushion means for limiting the amount of leftward axial shifting movement. Spring 41 is maintained within opening 40 by means of an externally threaded set screw means 42.

Figure 4:
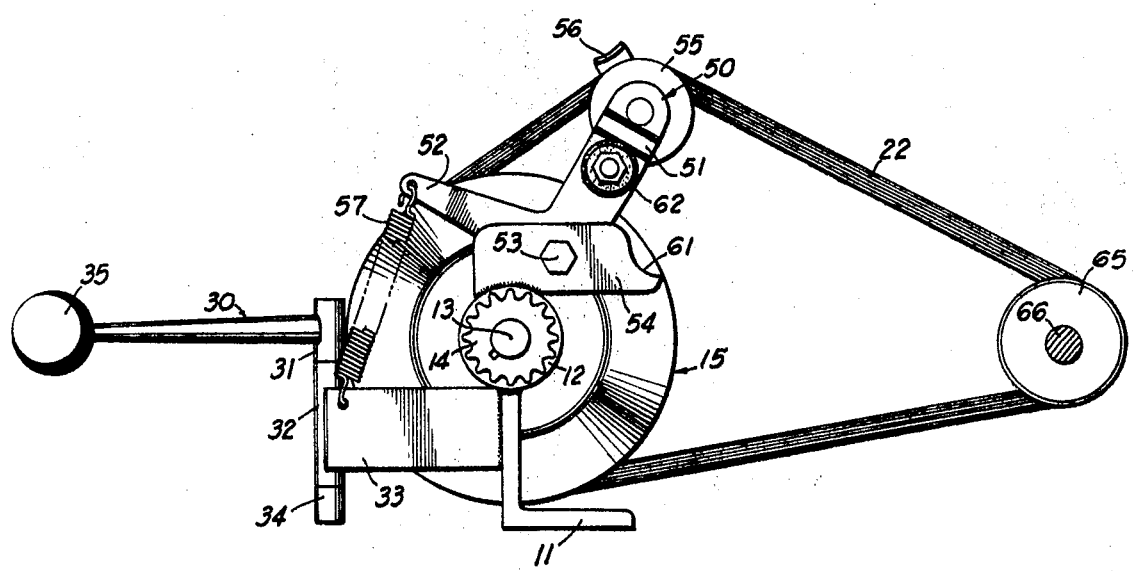
FIG. 4 is a side elevational view of FIG. 3.

As shown in FIGS. 1, 3 and 4, the variable ratio drive device includes an idler pulley assembly 50 which is operable for engaging belt 22 for maintaining the belt in an adjusted position when shifted between the larger diameter pulley 15 and the smaller diameter pulley 6. The idler pulley assembly 50 is constructed of a bell crank element having a pair of arms 51, 52 with the bell crank being pivoted at 53 on bracket 54. Bracket 54 is fixed to the upper surface of bushing 12, as shown in FIG. 4. Bell crank arm 51 is provided with an idler pulley 55 detailed for engagement with the belt 22. The belt 22 is maintained in position relative to idler pulley 55 by means of a retaining bracket 56. Bell crank arm 52 is provided with a tension spring 57 which is operatively connected to the support bracket 33. Spring 57 will bias the idler pulley assembly 50 clockwise, as shown in FIG. 1, to maintain proper tension on belt 22.

As shown in FIG. 4, the upstanding support bracket 54 is provided with an arcuate limit stop surface 61 which is detailed to contact a rubber bumper element 62. The rubber bumper element 62 is mounted on the bell crank arm 51 and is detailed to provide a stop means to limit the amount of clockwise movement of the idler pulley, as shown in FIG. 4, when the belt is shifted between the drive pulleys 15, 16. When the belt is caused to shift between the drive pulleys 15, 16, the engagement of the belt with the cutout or flat portion 21 will effect a clockwise movement of idler pulley 55 against the tension spring 57, and the rubber bumper element 62 will cooperate with arcuate surface 61 to limit the amount of clockwise movement of idler pulley 55. After the driving belt has been shifted and is seated for driving engagement with a selected one of the drive pulleys 15, 16, the tension spring 57 will again adjust the idler pulley 55 to maintain proper tension on the drive belt 22. As shown in FIGS. 1, 3 and 4, the drive belt is operatively engaged with a pulley 65 which is fixed to a shaft 66. Shaft 66 is arranged substantially parallel to drive shaft 13.

In operation, a drive can be delivered either from shaft 66 through belt 22 to the variable ratio drive pulleys 15, 16 or the drive can be delivered from sprocket 14, shaft 13 and the variable ratio drive pulleys 15, 16 to the belt 22 and shaft 66. In using the variable ratio drive device embodying the principles of the present invention, the device is supported in position by support bracket 11 relative to the apparatus which is to be driven and relative to the power delivery means. After the variable ratio drive device has been properly positioned, the belt 22 is engaged with one of the pulleys 15 or 16, idler pulley 55 and pulley 65. A variable ratio drive is provided between shafts 13 and 66 by effecting an axial shifting movement of the pair of pulleys 15, 16. The axial shifting movement of the pulleys 15, 16 is effected by grasping the handle means 35 thereby effecting a pivoting of lever 30. When lever 30 is pivoted, the pulleys 15, 16 are shifted in a desired direction either left or right on shaft 13. When the pair of pulleys 15, 16 is axially shifted relative to the drive shaft 13, the cutout or flat portion 21 will engage the belt 22 to cause the belt to be transferred from one pulley to the adjacent juxtaposed pulley. The completion of the transfer of the belt from one pulley to the second pulley is effected by the rotation of the pulleys during the axial shifting movement. After the pulleys have been shifted to transfer the drive belt from one pulley to the second pulley, the tension spring 57 will adjust the idler pulley 55 to maintain the proper tension on the drive belt 22.

It now becomes apparent that the above described illustrative embodiment of a variable ratio drive device is capable of obtaining the above stated objects and advantages. It is obvious that those skilled in the art may make modifications in the details of the construction without departing from the spirit of the invention which is to be limited only by the scope of the appended claims.

What is claimed is:

1. A variable ratio drive device comprising, in combination:
   a. a shaft;
   b. means for rotatably supporting said shaft;
   c. a belt; and
   d. a pair of axially shiftable pulleys rotatably fixed to said shaft, said pulleys being of different diameter and coaxially positioned adjacent each other, with each pulley including wall elements defining grooves in said pulleys, one wall element that is disposed between said grooves including a cutout portion to cause said belt to be shifted from one pulley to said other pulley in response to an axial shifting and rotary movement of said pair of pulleys.

2. A variable ratio drive device as defined in claim 1 further characterized in that said device includes means for axially shifting said pulleys on said shaft.

3. A variable ratio drive device as defined in claim 2 further characterized in that said pulley shifting means includes a lever pivotally mounted between its opposite ends, with one end associated with said pair of pulleys in rotatable, non-axially movable relationship, with an opposite end of said lever including handle shifting means.

4. A variable ratio drive device as defined in claim 1 further characterized in that said shaft includes an axially elongated slot extending therethrough, and wherein said pair of pulleys include a pin extending through said slot to permit axial shifting movement of said pulleys relative to said shaft while rotatably fixing said pulleys to said shaft.

5. A variable ratio drive device as defined in claim 4 further characterized in that said shaft includes cushion means operatively associated with axial movement of said pin to absorb impact during axial shifting movement of said pulleys.

6. A variable ratio drive device as defined in claim 1 further characterized in that said device includes an idler pulley supported on said device to be aligned selectively with said pair of pulleys, including means for biasing said idler pulley to a belt tightening position.

7. A variable ratio drive device as defined in claim 6 further characterized in that said idler pulley includes stop means for limiting movement of said idler pulley away from a belt tightening position.

8. A variable ratio drive device as defined in claim 7 further characterized in that said limit stop means includes impact absoring means for absorbing impact of movement of said idler pulley away from said belt tightening position.

9. A variable ratio drive device as defined in claim 7 further characterized in that said idler pulley is supported for pivotal movement between a belt tension and belt relaxed position, with said lever including spring means for urging said lever and idler pulley toward said belt tension position, and wherein said lever includes a rubber bumper element operatively associated with fixed limit stop means for absorbing impact and for limiting pivotal displacement of said lever and idler pulley in a direction away from said belt tension position during shifting movement of said belt from one of the pulleys to the other pulley.

10. A variable ratio drive device comprising, in combination:
   a. base frame means;
   b. a bushing supported on said base frame means;
   c. a shaft rotatably supported in said bushing;
   d. a belt;
   e. a pair of pulleys supported on said shaft for axial shifting movement relative thereto, with said pulleys being fixed to said shaft for rotary movement therewith, said pulleys being of different diameter and coaxially positioned adjacent each other, with each pulley including wall elements defining grooves in said pulleys, one wall that is disposed between said grooves including a cutout portion to cause said belt to be shifted from one pulley to said other pulley in response to an axial shifting and rotary movement of said pair of pulleys;
   f. a lever pivotally mounted on said base frame means, said lever including a yoke attached to one end, with said yoke being fixed to said pair of pulleys for rotary movement relative thereto and operable for effecting axial shifting of said pair of pulleys relative to said shaft, with an opposite end of said lever including handle shifting means; and
   f. a bell crank mounted on said bushing for pivotal movement about an axis substantially parallel to said shaft axis, said bell crank being movable in a plane parallel to the driving plane of said pair of pulleys, with an idler pulley supported adjacent an extended end of one of said bell crank arms and adapted to engage and maintain tension on said belt supported on a selected one of said pair of pulleys, and wherein a tension spring is operatively connected to a second arm of said bell crank for urging said idler pulley to a belt tightening position, and wherein said bell crank includes a rubber bumper element adapted to contact a fixed limit stop means for limiting the pivotal displacement of said idler pulley in a direction away from said spring tension means, with said rubber bumper element detailed for absorbing impact when said idler pulley is rapidly displaced against said spring means during shifting movement of said belt from the smaller pulley to the larger pulley.

* * * * *